United States Patent
Pylkkanen

(10) Patent No.: US 9,769,390 B2
(45) Date of Patent: Sep. 19, 2017

(54) METHOD AND APPARATUS FOR ENHANCED DIGITAL IMAGING

(71) Applicant: Nokia Technologies Oy, Espoo (FI)

(72) Inventor: Tom Pylkkanen, Kaarina (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/022,285

(22) PCT Filed: Nov. 20, 2013

(86) PCT No.: PCT/FI2013/051087
§ 371 (c)(1),
(2) Date: Mar. 16, 2016

(87) PCT Pub. No.: WO2015/075295
PCT Pub. Date: May 28, 2015

(65) Prior Publication Data
US 2016/0234442 A1    Aug. 11, 2016

(51) Int. Cl.
*H04N 5/232*    (2006.01)
*H04N 5/225*    (2006.01)
*G03B 17/02*    (2006.01)
*G03B 19/00*    (2006.01)

(52) U.S. Cl.
CPC ......... *H04N 5/23296* (2013.01); *G03B 17/02* (2013.01); *G03B 19/00* (2013.01); *H04N 5/2258* (2013.01); *H04N 5/23293* (2013.01)

(58) Field of Classification Search
CPC ............. H04N 5/23296; H04N 5/2259; H04N 5/23293; G03B 17/02; G03B 19/00

USPC .................................................. 348/362, 344
See application file for complete search history.

(56) References Cited

U.S. PATENT DOCUMENTS

| | | | |
|---|---|---|---|
| 6,532,035 B1 * | 3/2003 | Saari .................... | G02B 13/005 348/14.01 |
| 6,992,699 B1 * | 1/2006 | Vance .................... | H04N 7/142 348/207.99 |
| 7,051,938 B2 * | 5/2006 | Johnson ............... | H04N 5/2259 348/E5.03 |
| 7,567,287 B2 * | 7/2009 | Hyatt ................... | H04N 5/2254 348/340 |
| 2007/0116454 A1 * | 5/2007 | Tsai ....................... | G03B 17/17 348/E5.028 |
| 2007/0189763 A1 | 8/2007 | Kojima et al. ............... | 396/351 |

(Continued)

FOREIGN PATENT DOCUMENTS

| | | |
|---|---|---|
| DE | 10 2004 025 713 A1 | 12/2005 |
| JP | 2002-287008 | 10/2002 |

(Continued)

*Primary Examiner* — Nhan T Tran
(74) *Attorney, Agent, or Firm* — Harrington & Smith

(57) ABSTRACT

Method and apparatus are disclosed in which an optical image connector is moved from a second position to a first position. Light is received from a first direction and accordingly forming of a first optical image on an image sensor is caused using a first optical input. The optical image connector is moved from the first position to the second position. Light is received by the optical image connector from a second optical input. The second optical input is in a direction at least 90 degrees different than the first direction. A second optical image corresponding to the received light is formed on the image sensor by the optical image connector.

20 Claims, 3 Drawing Sheets

(56) References Cited

U.S. PATENT DOCUMENTS

2012/0249408 A1* 10/2012 Moliton ............... G02B 27/017
                                                             345/156
2014/0055624 A1* 2/2014 Gaines ................. H04N 5/2254
                                                             348/207.1

FOREIGN PATENT DOCUMENTS

| JP | 2004-336804 | 11/2004 |
| JP | 2007-116361 | 5/2007 |

* cited by examiner

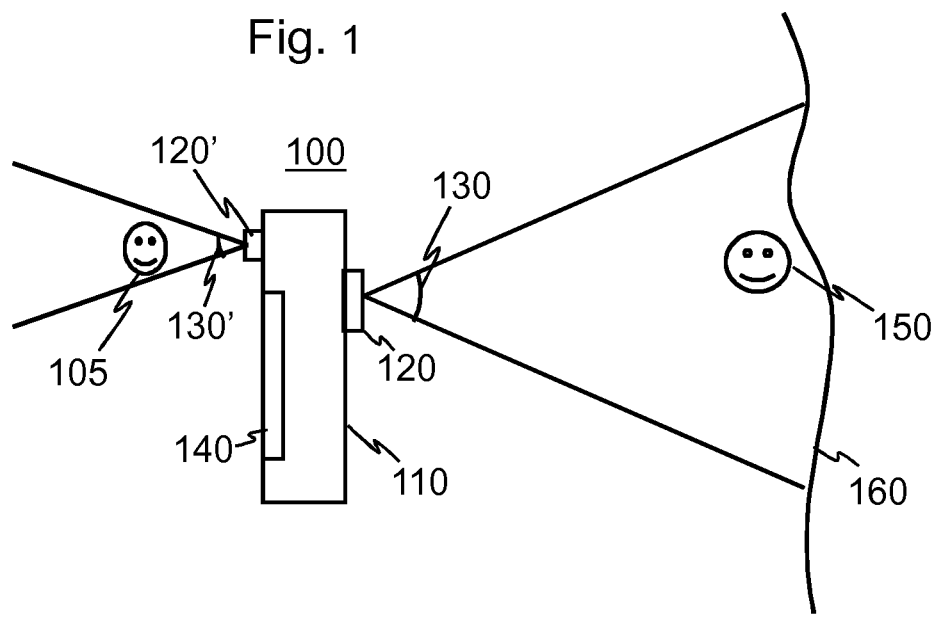
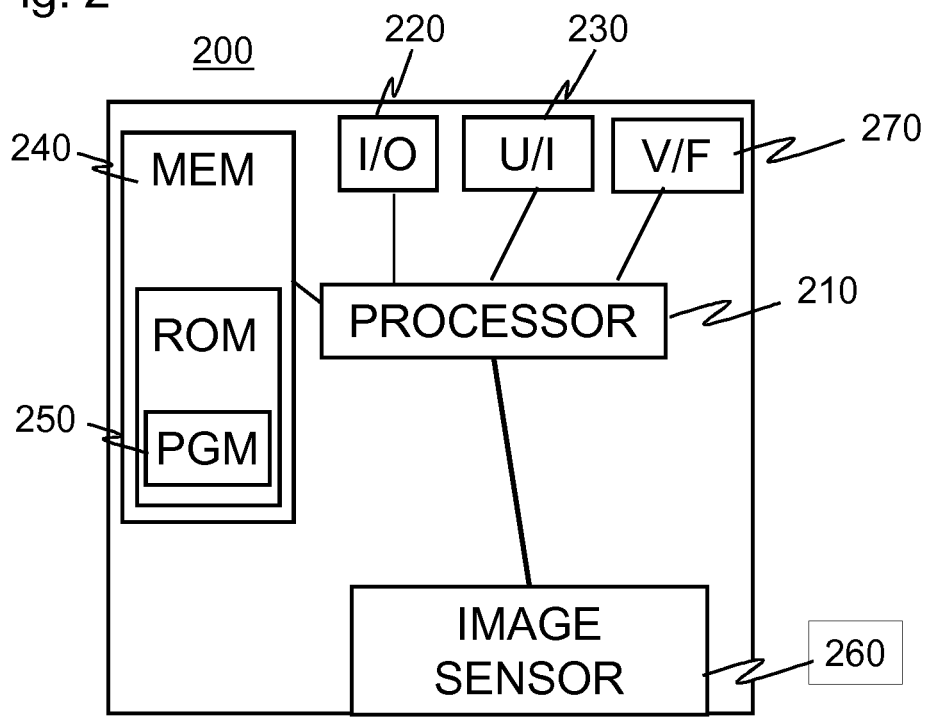

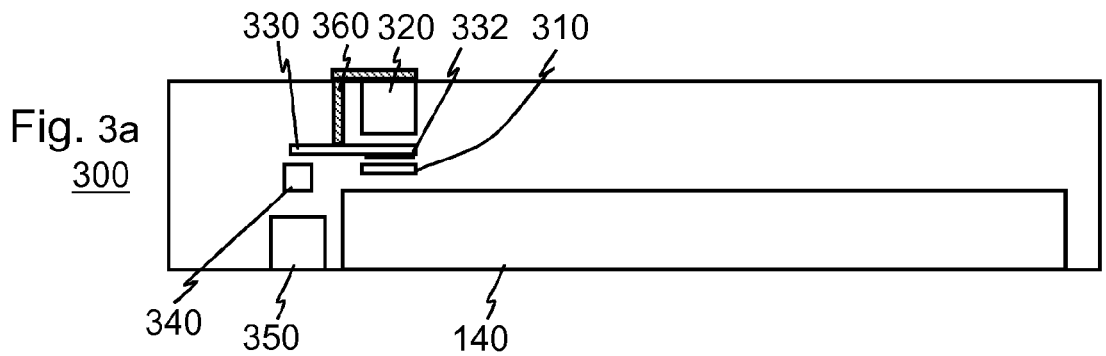
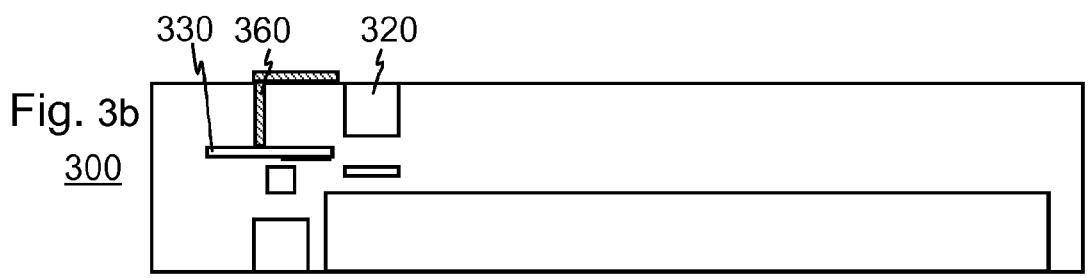
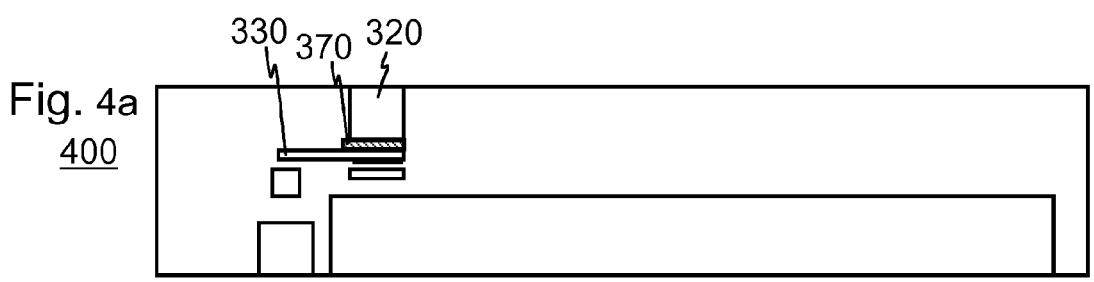
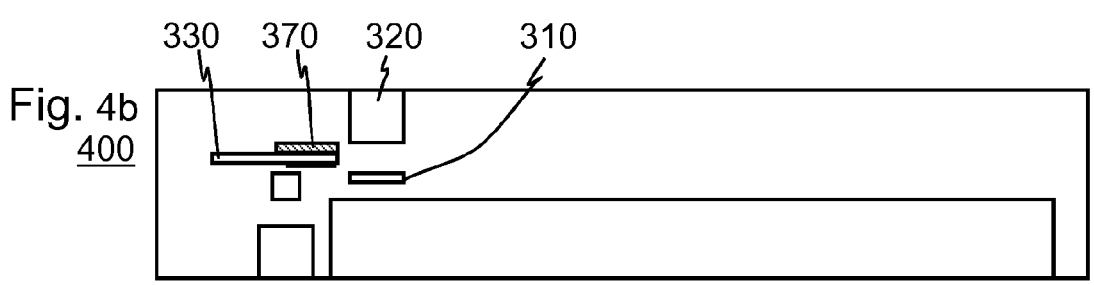

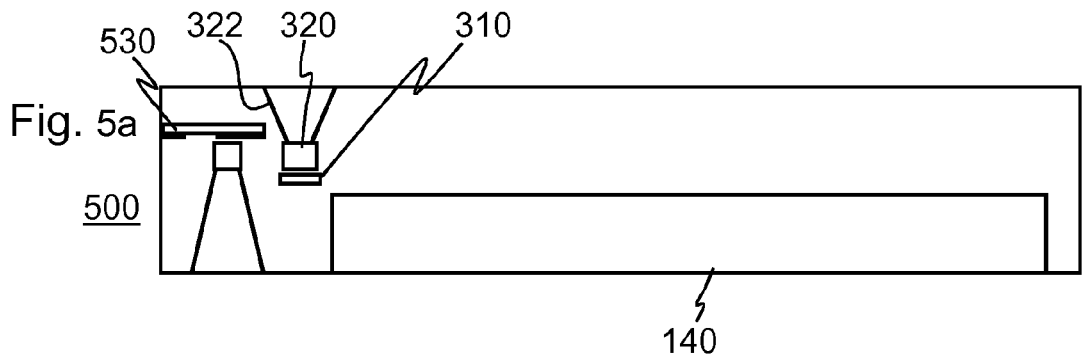
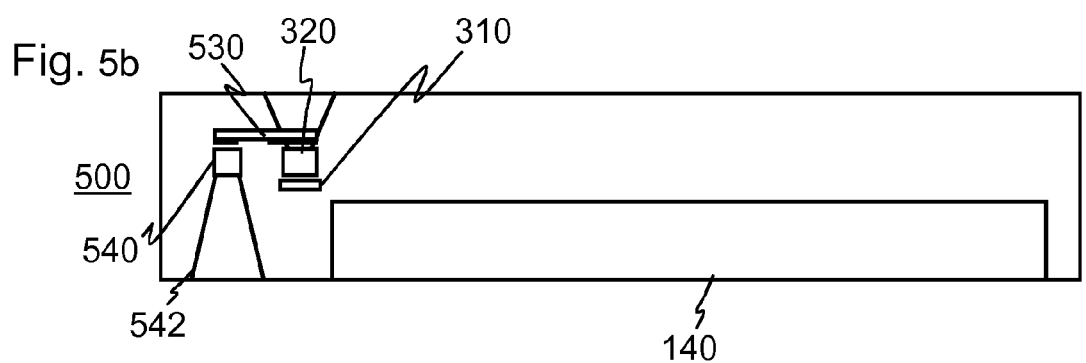
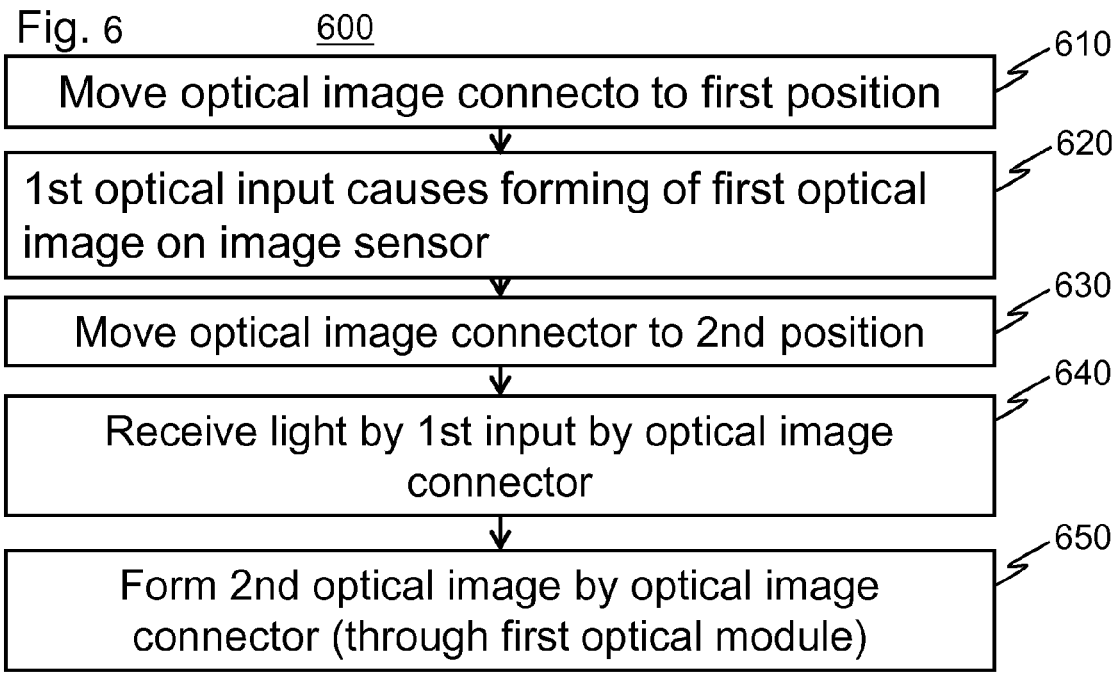

METHOD AND APPARATUS FOR ENHANCED DIGITAL IMAGING

TECHNICAL FIELD

The present application generally relates to enhanced digital imaging.

BACKGROUND

This section illustrates useful background information without admission of any technique described herein representative of the state of the art.

Modern mobile phones comprise cameras for capture of digital images. Many mobile phones have two cameras: a main camera on a backside of the mobile phone for taking photographs as with dedicated cameras and a front camera for video conferencing and for providing a virtual make-up mirror by displaying a mirror image of the front camera image on a front display of the mobile phone.

In two-camera phones, the front camera is typically far simpler than the main camera, as the front camera is intended for web camera type use. There are yet some special solutions in which one camera can be pivoted to different directions. Mobile phones are yet sometimes exposed to harsh handling, even dropping on floor. Combined with their perceived high importance for personal communications, the users are poorly tolerant to mechanical faults in mobile phones even if such faults resulted from actual abuse. Therefore, modern mobile phones with front and rear imaging capability are manufactured to contain dedicated front and rear cameras.

SUMMARY

Various aspects of examples of the invention are set out in the claims.

According to a first example aspect of the present invention, there is provided an apparatus comprising:
an image sensor configured to receive optical images and to form corresponding digital images;
a first optical input towards a first direction and configured to produce a corresponding first optical image on the image sensor;
a second optical input towards a second direction that is at least 90 degrees different from the first direction; and
an optical image connector configured to receive a second optical image from the second optical input and to form a corresponding second optical image on the image sensor.

The first optical input may be a light field objective; a wide angle objective; a field of view narrowing objective or a zoom objective.

The second optical input may be an optical shifting module; a light field objective; a field of view narrowing objective or a zoom objective; or an opening allowing the optical image connector to receive the second optical image.

The optical image connector may be configured to form the second optical image on the image sensor through the first optical input.

The optical image connector may comprise or be formed of an exit pupil expander.

The optical image connector may comprise or be formed of one or more optical elements selected from the group of: prisms; mirrors; lenses; Fresnel lenses; and exit pupil expanders. The optical image connector may comprise two or more exit pupil expanders each configured to form some frequency range portion of the second optical image. One frequency range portion may represent e.g. one or more visible colors.

The second direction may differ from the first direction by at least 150 degrees. The second direction may differ from the first direction by 180 degrees.

The apparatus may comprise a display for user interaction.

The first direction may be towards the nominal viewing direction of the display. Alternatively, the second direction may be towards the nominal viewing direction of the display.

The optical image connector may comprise a connector output configured to perform the forming of the corresponding second optical image on the image sensor. The connector output may be movable to a first position between the image sensor and the first optical input. The connector output may be movable away from the first position to a second position in which the first optical input can form the first optical image on the image sensor.

The output may be separable from other parts of the optical image connector.

The optical image connector or the output may be slidably movable. Alternatively or additionally, the optical image connector or the output may be rotatably movable.

The first optical input may comprise a first optical module.

The output may be configured to form the second optical image on the image sensor without forming any obstacle between the first optical module and the image sensor. The apparatus may further comprise a first controllable cover configured to inhibit arrival of light through the first optical module. The apparatus may further comprise a second controllable cover configured to inhibit arrival of light through the second optical input.

The optical image connector may be configured to be movable such that in a first position the connector output is configured to form the second optical image on the image sensor through the first optical input. In the first position of the optical image connector, the connector output and the image sensor may sandwich the first optical input.

The first optical input may be configured to produce a first field of view.

The optical image connector may comprise a converging element configured to narrow light rays. The converging element may comprise an afocal lens. The second optical input may be configured to produce a second field of view. The second field of view may be narrower than the first field of view. The second field of view may be suited for video conferencing. The first field of view may cover 40 to 70 degrees, e.g. 60 degrees. The second field of view may cover 30 to 60 degrees, e.g. 35 degrees or 40 degrees.

The apparatus may further comprise an optical image stabilizer. The optical image stabilizer may be configured to perform the optical image stabilizing by moving the image sensor. Alternatively, the optical image stabilizer may be configured to move the first optical input.

According to a second example aspect of the present invention, there is provided a method comprising:
moving an optical image connector from a second position to a first position;
receiving light from a first direction and accordingly causing forming of a first optical image on an image sensor, by a first optical input;
moving the optical image connector from the first position to the second position; and receiving light by the optical image connector from the second optical input, the second optical input being in a direction at least 90 degrees different than the first direction and forming corresponding second optical image on the image sensor by the optical image connector.

In an example embodiment, the second optical image is formed via the first optical module.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 1 shows a schematic system for use as a reference with which some example embodiments of the invention can be explained;

FIG. 2 shows a block diagram of the imaging apparatus of FIG. 1;

FIG. 3a shows a section view of a camera device according to an example embodiment, when in a first configuration;

FIG. 3b shows a section view of the a camera device of FIG. 3a, when in a second configuration;

FIG. 4a shows a section view of a camera device according to an example embodiment, when in a first configuration;

FIG. 4b shows a section view of the camera device of FIG. 4a, when in a second configuration;

FIG. 5a shows a section view of a camera device according to an example embodiment, when in a first configuration;

FIG. 5b shows a section view of the camera device of FIG. 5a, when in a second configuration; and FIG. 6 shows a flow chart illustrative of a process according to an example embodiment.

DETAILED DESCRIPTION OF THE DRAWINGS

An example embodiment of the present invention and its potential advantages are understood by referring to FIGS. 1 through 6 of the drawings. In this document, like reference signs denote like parts or steps.

The following description first describes various generic structures suitable for implementing some example embodiments after which more specific structures and examples on some processes are described.

FIG. 1 shows a schematic system 100 for use as a reference with which some example embodiments of the invention can be explained. The system 100 comprises a device 110 such as a camera phone, gaming device, security camera device, personal digital assistant, tablet computer or a digital camera having a first imaging unit 120 with a first field of view 130. The device 110 further comprises a display 140 and a second imaging unit 120' with a second field of view 130'. FIG. 1 also shows a user 105 and an image object 150 that is being imaged by the imaging unit 120 and a background 160 such as a curtain behind the image object.

In FIG. 1, the image object 150 is relatively small in comparison to the field of view at the image object 150. Next to the image object 150, there is a continuous background 160. While this setting is not by any means necessary, it serves to simplify FIG. 1 and description of some example embodiments of the invention.

FIG. 2 shows a block diagram of an imaging apparatus 200 of an example embodiment of the invention. The imaging apparatus 200 is suited for operating as the device 110. The apparatus 200 comprises a communication interface 220, a host processor 210 coupled to the communication interface module 220, and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded and executed by the host processor 210. The software 250 may comprise one or more software modules and can be in the form of a computer program product that is software stored in a memory medium. The imaging apparatus 200 further comprises an image sensor 260 and a viewfinder 270 each coupled to the host processor 210. The viewfinder 270 is implemented in an example embodiment by using a display configured to show a live camera view.

It shall be understood that any coupling in this document refers to functional or operational coupling; there may be intervening components or circuitries in between coupled elements.

The communication interface module 220 is configured to provide local communications over one or more local links. The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, an input of the processor 210 configured to receive information from the digital image capture unit 260 and an output of the processor 210 configured to provide information to the viewfinder.

FIG. 3a shows a section view of a camera device 300 according to an example embodiment, when in a first configuration. The camera device 300 may be suited for use as the device 110 of FIG. 1. The camera device 300 comprises a display 140 e.g. for use as a viewfinder. The camera device further comprises an image sensor 310 configured to receive optical images and to form corresponding digital images. A first optical module 320 is drawn optically in series with the image sensor. The first optical module 320 is configured to produce a corresponding first optical image on the image sensor 310. FIG. 3 further shows an optical image connector 330 that is also in optical series with the image sensor 310. The optical image connector 330 has an output 332 for producing a second optical image on the image sensor 310. FIG. 3 further shows an intervening optical element 340 such as an afocal converging element and a second optical module 350 directed to opposite direction in comparison to the first optical element 320.

The optical image connector 330 could block or interfere the producing of the first optical image on the image sensor 310. Moreover, the producing of the second optical image on the image sensor 310 might be interfered by light possibly received through the first optical module 320. Hence, a cover 360 is drawn to cover the first optical module 320 when the optical image connector 330 is used to produce the second optical image on the image sensor.

FIG. 3*b* shows a section view of the camera device 300 of FIG. 3*a*, when in a second configuration. Here, the optical image connector 330 and the cover 360 are moved away such that the first optical module 320 sees to the rear side of the camera device 300 (opposite to the display 140) and the optical image connector no longer casts significant amount of light on the image sensor 310.

Notice that there are other example embodiments, in which the first optical module and the second optical modules are in directions different by 90 degrees or by at least 150 degrees. Also the output 332 is optional or dependent on the structure of the optical image connector 330. In some example embodiments, the output 332 comprises one or more distinguishable parts whereas in some other example embodiments, the output is integrally formed by the optical image connector 330.

In FIGS. 3*a* and 3*b*, the cover 360 is configured to move synchronously with the optical image connector 330. The movement may be produced e.g. by joining the cover 360 directly or through interconnecting mechanics with the optical image connector 330. On the other hand, the movement can alternatively be produced e.g. by using an electric actuator. It is also possible that the optical image connector 330 and the cover 360 separately movable e.g. by a user with a suitable member.

The moving of a cover part and/or of the optical image connector 330 is performed in an example embodiment by sliding; rotating in a functional plane (e.g. cover plane) of the part in question; rotating otherwise than in the functional plane e.g. by pivoting; moving by a cam; and any combination thereof.

Looking at FIG. 3*b*, it appears that some light might leak diagonally from an edge of the optical image connector 330 to the image sensor 310. To this end, a leak stopper (not shown) such as a wall can be provided to inhibit such leak and/or the optical image connector 330 can be built to move behind one or more corners such that entry of leak light can be effectively stopped. In yet another alternative, a cover such as the cover 360 can be provided to inhibit passing of light through the second optical module 350.

FIG. 4*a* shows a section view of a camera device 400 according to an example embodiment, when in a first configuration. This example embodiment illustrates a construction in which the first optical module 320 is not covered from outside to inhibit leakage of light to the image sensor 310 when the optical image connector 330 is aligned with the image sensor 310. Instead, an internal cover 370 is moved between the optical image connector 330 and the first optical module 320.

FIG. 4*b* shows a section view of the camera device 400, when in a second configuration. Here, the optical image connector 330 and the cover 370 are moved away from the optical path between the first optical module 320 and the image sensor 310.

The first optical module 320 is formed, for example, of one or more elements selected from a group consisting of: light field objectives; wide angle objectives; field of view narrowing objectives; and zoom objectives.

The second optical objective 350 is formed, for example, of one or more elements selected from a group consisting of: optical shifting modules; light field objectives; field of view narrowing objectives; and zoom objectives.

The optical image connector 330 can be constructed in a number of different ways. For example, the optical image connector 330 comprises or is formed of one or more optical elements selected from the group of: prisms; mirrors; lenses; Fresnel lenses; and exit pupil expanders. In FIGS. 3*a*, 3*b*, 4*a* and 4*b*, the optical image connector 330 is formed using an exit pupil expander and an optical element such as an afocal converging lens.

FIG. 5*a* shows a section view of a camera device 500 according to an example embodiment, when in a first configuration. This example embodiment illustrates a construction in which a movable optical image connector 530 is provided to selectively allow light fall on the first optical module 320 through a first optical input 322 from a first direction or through a second optical input (542 in FIG. 5*b*) from a second direction. In FIG. 5*a*, the movable optical image connector 530 is moved to a first position in which the movable optical image connector 530 neither blocks the first optical module 320 nor optically connects the second optical module 540 to the first optical module 320. FIG. 5*b* shows the movable optical image connector 530 in a second position in which the movable optical image connector 530 blocks the first optical module 320 and optically connects the second optical module 540 to the first optical module 320.

In an example embodiment, the first optical input is formed by an opening defined by the body of the camera device 500. In an example embodiment, such an opening is covered by a glass window. The glass window can be made user replaceable.

In another example embodiment, the first optical input comprises one or more optical elements such as lenses, mirrors and prisms.

In an example embodiment, the second optical input is formed by an opening defined by the body of the camera device 500. In an example embodiment, such an opening is covered by a glass window. The glass window can be made user replaceable.

In another example embodiment, the second optical input comprises one or more optical elements such as lenses, mirrors and prisms.

The second optical module 540 is optional. In an alternative example embodiment, there is no second optical module 540 but instead the movable optical image connector 530 is configured to form an image corresponding to its view through the second optical input 542 and the first optical module 320 onto the image sensor 310.

In an example embodiment, the first optical module is formed integrally by the optical image connector 530.

In an example embodiment, the second optical module is formed integrally by the optical image connector 530.

FIG. 6 shows a flow chart illustrative of a process according to an example embodiment. In the process, the optical image connector 530 is moved from a second position to a first position, 610. Then, the first optical input 322 receives light from a first direction and accordingly causes forming of a first optical image on an image sensor, 620.

The optical image connector 530 is moved from the first position to the second position, 630. Light is received by the optical image connector 530 from the second optical input 542, the second optical input 542 being in a direction at least 90 degrees different than the first direction, 640. A corresponding second optical image is formed on the image sensor 310 by the optical image connector, 650.

In an example embodiment, the second optical image is formed via the first optical module 320 as shown in FIG. 5b.

Without in any way limiting the scope, interpretation, or application of the claims appearing below, a technical effect of one or more of the example embodiments disclosed herein is that an imaging device capable of imaging two different sides can be made robust and inexpensive. Another technical effect of one or more of the example embodiments disclosed herein is that camera buses, image sensors and various other digital imaging circuitries may be omitted while providing a second imaging direction. Another technical effect of one or more of the example embodiments disclosed herein is that for a camera objective, an objective cover can be provided with a further function of blocking undesired exposing through an unused objective. Yet another technical effect of one or more of the example embodiments disclosed herein is that the weight of an imaging device capable of imaging two different sides can be reduced without use of expensive or fragile body structure changes.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. The appended abstract is incorporated by reference herein as one example embodiment.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    an image sensor configured to receive optical images and to form corresponding digital images;
    a first optical input towards a first direction and configured to produce a corresponding first optical image on the image sensor;
    a second optical input towards a second direction that is at least 90 degrees different from the first direction;
    an optical image connector configured to receive a second optical image from the second optical input and to form a corresponding second optical image on the image sensor, wherein the optical image connector comprises at least one exit pupil expander in optical series with the image sensor; and
    a cover configured to move synchronously with the optical image connector and to block the first optical input when the optical image connector forms the corresponding second optical image.

2. The apparatus of claim 1, wherein the first optical input comprises at least one of: a light field objective; a wide angle objective; a field of view narrowing objective or a zoom objective.

3. The apparatus of claim 1, wherein the second optical input comprises at least one of an optical shifting module, a light field objective, a field of view narrowing objective and a zoom objective.

4. The apparatus of claim 1, wherein the optical image connector is configured to form the second optical image on the image sensor through the first optical input.

5. The apparatus of claim 1, wherein the optical image connector further comprises one or more optical elements selected from the group of prisms, mirrors, lenses and Fresnel lenses.

6. The apparatus of claim 1, wherein the optical image connector comprises two or more exit pupil expanders each configured to form some frequency range portion of the second optical image.

7. The apparatus of claim 1, wherein the second direction differs from the first direction by at least 150 degrees.

8. The apparatus of claim 1, wherein the apparatus comprises a display for user interaction.

9. The apparatus of claim 8, wherein the first direction is towards the nominal viewing direction of the display.

10. The apparatus of claim 1, wherein the optical image connector comprises a connector output configured to perform the forming of the corresponding second optical image on the image sensor.

11. The apparatus of claim 10, wherein the connector output is movable to a first position between the image sensor and the first optical input.

12. The apparatus of claim 10, wherein the connector output is separable from other parts of the optical image connector.

13. The apparatus of claim 10, wherein the optical image connector or the connector output is slidably movable.

14. The apparatus of claim 10, wherein the optical image connector or the connector output is rotatably movable.

15. The apparatus of claim 10, wherein the first optical input comprises a first optical module.

16. The apparatus of claim 15, wherein the optical image connector is configured to be movable such that in a first position the connector output is configured to form the second optical image on the image sensor through the first optical module.

17. The apparatus of claim 1, wherein the first optical input is configured to produce a first field of view and the second optical input is configured to produce a second field of view that is narrower by its breadth than the first field of view.

18. A method comprising:
    moving an optical image connector from a second position to a first position;
    receiving light from a first direction and accordingly causing forming of a first optical image on an image sensor, by a first optical input;
    moving the optical image connector from the first position to the second position; and receiving light by the optical image connector from the second optical input, the second optical input being in a direction at least 90 degrees different than the first direction and forming corresponding second optical image on the image sensor by the optical image connector, wherein the optical image connector comprises at least one exit pupil expander in optical series with the image sensor; and moving a cover synchronously with the optical image connector to block the first optical input when the optical image connector forms the corresponding second optical image.

19. The method of claim 18, wherein the second optical image is formed via the first optical module.

20. The apparatus of claim 1, wherein the second optical input comprises an opening allowing the optical image connector to receive the second optical image.

* * * * *